(12) United States Patent
Lee et al.

(10) Patent No.: US 10,033,929 B2
(45) Date of Patent: Jul. 24, 2018

(54) CAMERA DEVICE AND IMAGE STORAGE METHOD

(71) Applicant: Samsung Electronics Co., Ltd., Gyeonggi-do (KR)

(72) Inventors: Jaemyoung Lee, Seoul (KR); Sungsik Lee, Seoul (KR); Hoyoung Lee, Seoul (KR)

(73) Assignee: Samsung Electronics Co., Ltd (KR)

( * ) Notice: Subject to any disclaimer, the term of this patent is extended or adjusted under 35 U.S.C. 154(b) by 282 days.

(21) Appl. No.: 14/012,555

(22) Filed: Aug. 28, 2013

(65) Prior Publication Data
US 2014/0063316 A1 Mar. 6, 2014

(30) Foreign Application Priority Data

Aug. 29, 2012 (KR) .................. 10-2012-0094645

(51) Int. Cl.
| | |
|---|---|
| *H04N 5/222* | (2006.01) |
| *H04N 5/232* | (2006.01) |
| *H04N 5/77* | (2006.01) |
| *H04N 9/804* | (2006.01) |

(52) U.S. Cl.
CPC ......... *H04N 5/23293* (2013.01); *H04N 5/772* (2013.01); *H04N 9/8042* (2013.01)

(58) Field of Classification Search
CPC .................. H04N 5/23293; H04N 5/232
See application file for complete search history.

(56) References Cited

U.S. PATENT DOCUMENTS

| | | | | |
|---|---|---|---|---|
| 7,136,096 | B1 * | 11/2006 | Yamagishi | H04N 5/23293 348/218.1 |
| 2007/0260994 | A1 * | 11/2007 | Sciammarella et al. | 715/769 |
| 2009/0141024 | A1 * | 6/2009 | Lee et al. | 345/420 |
| 2009/0237547 | A1 * | 9/2009 | Misawa et al. | 348/333.01 |
| 2010/0146446 | A1 * | 6/2010 | Ahn et al. | 715/821 |
| 2011/0105192 | A1 * | 5/2011 | Jung et al. | 455/566 |

* cited by examiner

*Primary Examiner* — Twyler Haskins
*Assistant Examiner* — Carramah J Quiett
(74) *Attorney, Agent, or Firm* — The Farrell Law Firm, P.C.

(57) ABSTRACT

A image storing apparatus and method is provided for storing live view image in a camera device with the indication of the progress of storing the image. The method includes displaying a live view image in a preview mode; capturing the image in response to a capture request; processing a preconfigured image to generate an animation image, the animation image indicating progress of storing the captured image; and displaying, when the captured image is completely stored, a thumbnail image of the captured image instead of the animation image.

14 Claims, 9 Drawing Sheets

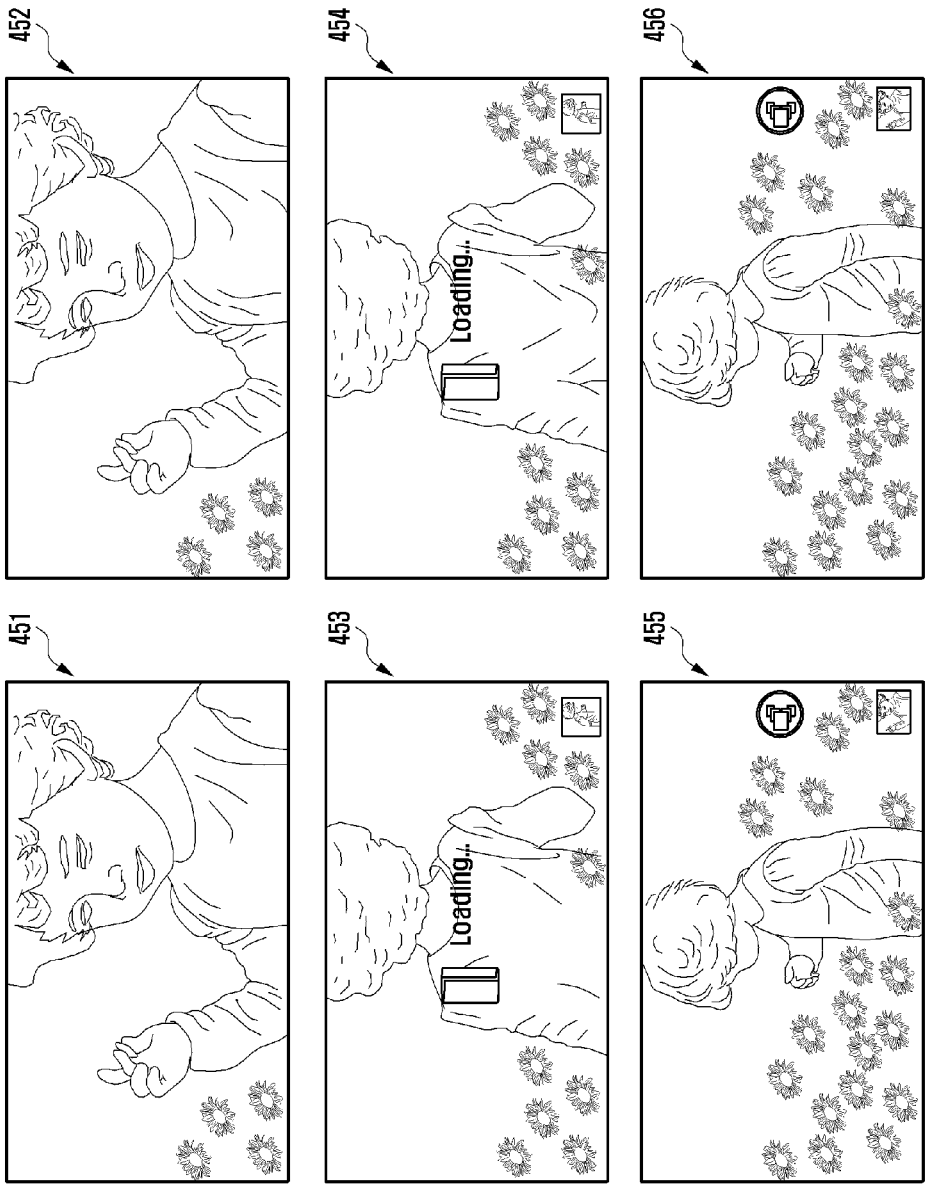

CAMERA DEVICE AND IMAGE STORAGE METHOD

PRIORITY

This application claims priority under 35 U.S.C. § 119(a) to a Korean Patent Application filed on Aug. 29, 2012 in the Korean Intellectual Property Office and assigned Serial No. 10-2012-0094645, the disclosure of which is incorporated herein by reference.

BACKGROUND OF THE INVENTION

1. Field of the Invention

The present invention relates to an image storage apparatus and method for use in a camera and, more particularly, to an apparatus and method for storing live view images in a camera device with an indication of the progress of storing the image.

2. Description of the Related Art

Typically, a camera device or a camera-equipped mobile terminal displays a live view image in a preview mode in which the camera is running. In the preview mode, the camera device performs size and color conversion on the image input from the camera to generate a predetermined image format. In the preview mode, if the user pushes the shutter button, to activate a shutter on or shutter release function, the camera device performs a focusing operation to acquire the image focused with preset parameters. The image acquired in this way is processed and compressed to be stored in a memory.

When storing the still image captured in the preview mode, the camera device has to perform the focusing operation and image processing (e.g. Analog to Digital conversion), and the control unit of the camera device has to perform a complex operation control, whereby a delay in storing the image in the memory is created. The user may check the operation of the camera while the camera device captures an image and stores the image in the memory. However, since there is no way of checking the time taken for capturing and storing an image in the preview mode, the user may push the shutter button repeatedly for continuous photographing before the previous photographing process has been completed and, this may cause a failure in acquiring an intended still image.

SUMMARY OF THE INVENTION

The present invention has been made to address at least the problems and disadvantages described above, and to provide at least the advantages described below. Accordingly, an aspect of the present invention provides an apparatus and method for indicating the time taken for storing a still image captured in response to a capture request input to a camera device or camera-equipped mobile terminal operating in a live view mode.

In accordance with an aspect of the present invention, an image storage method of a camera device includes displaying a live view image in a preview mode; capturing the image in response to a capture request; processing a preconfigured image to generate an animation image, the animation image indicating progress of storing the captured image; and displaying, when the captured image is completely stored, a thumbnail image of the captured image instead of the animation image.

In accordance with another aspect of the present invention, a camera device includes a camera for acquiring an image; a display unit configured to display the acquired image; a memory configured to store the image; and a control unit configured to control the display unit to display a live view image in a preview mode, capture the image in response to a capture request, process a preconfigured image to generate an animation image, the animation image indicating progress of storing the captured image, and control the display unit to display, when the captured image is completely stored, a thumbnail image of the captured image instead of the animation image.

BRIEF DESCRIPTION OF THE DRAWINGS

The above and other aspects, features, and advantages of the present invention will be more apparent from the following detailed description, when taken in conjunction with the accompanying drawings, in which:

FIGS. 4A to 4E are diagrams illustrating screens displayed in association with the procedure of capturing and storing still images in a memory in the image storage method of FIG. 3.

DETAILED DESCRIPTION OF EMBODIMENTS OF THE PRESENT INVENTION

Embodiments of the present invention are described in detail with reference to the accompanying drawings. The same reference numbers are used throughout the drawings to refer to the same or like parts.

Figure 1:
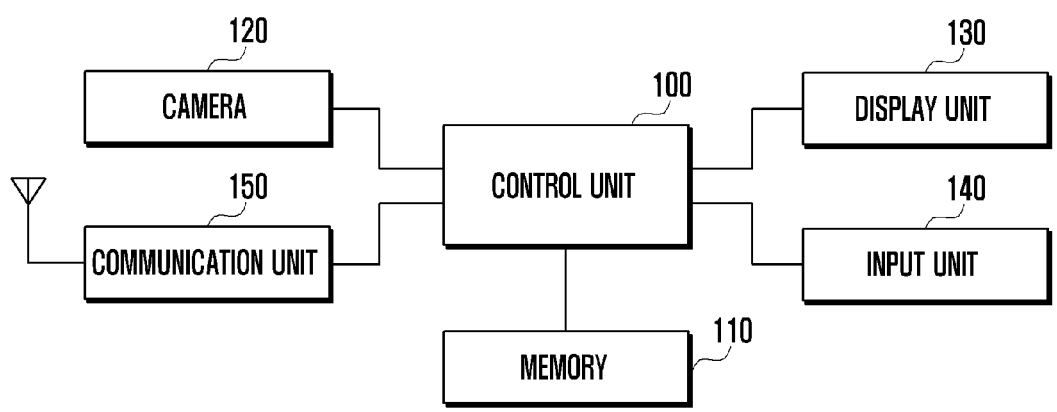
FIG. 1 is a block diagram illustrating the configuration of a mobile terminal according to an embodiment of the present invention.

FIG. 1 is a block diagram illustrating the configuration of a mobile terminal according to an embodiment of the present invention. In the following, the description is directed to a camera device.

Referring to FIG. 1, the camera unit 120 is provided with a sensor for acquiring an image. The control unit 100 controls overall operations of the camera device and buffers the images input through the camera in the form of a thumbnail animation until a still image is saved in response to a capture request in the preview mode. The control unit 100 includes an image processor for processing the image acquired by the camera, a codec for encoding/decoding and compressing the image, and a thumbnail image generator for processing the image to generate a thumbnail image.

The memory 110 includes a program memory for storing an Operating System (OS) of the camera device and programs associated with the method according to an embodiment of the present invention, and a data memory for storing tables for use in operation of the terminal and data generated by the programs.

The display unit 130 displays the image taken by the camera 120 under the control of the control unit 100. The display unit 130 may be implemented with one of a Liquid Crystal Display (LCD) and an Organic Light Emitting Diode (OLED). The input unit 140 generates an input signal to the camera device. The input unit 140 includes at least one of a touch panel and external manipulation buttons. The display unit 130 and the input unit 140 may be integrated into a touchscreen.

The radio communication unit 150 is responsible for radio communication with a base station and other devices. Here, the communication unit 150 may include a transmitter for up-converting and amplifying the signal to be transmitted and a receiver for low noise amplifying and down-converting the received signal. The communication unit may further include a modulator and a demodulator. In this case, the modulator/demodulator is configured to support at least one of LTE, WCDMA, GSM, Wi-Fi, WIBRO, NFC, Bluetooth, etc. In an embodiment of the present invention, it is assumed that the communication unit 150 is provided with a 3 G and/or 4 G communication module, Wi-Fi module, and a Bluetooth mode.

Figure 2:
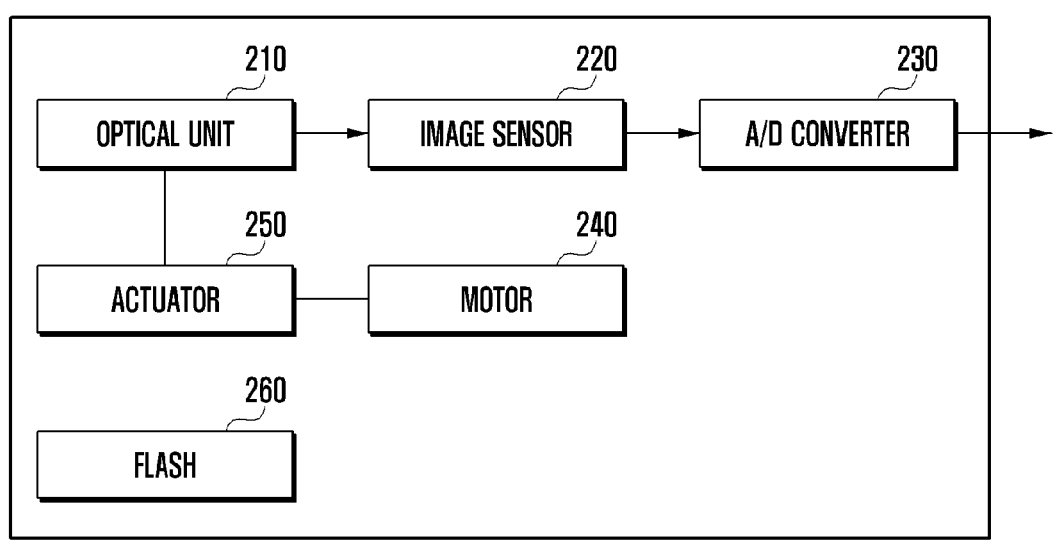
FIG. 2 is a block diagram illustrating the configuration of the camera of FIG. 1.

FIG. 2 is a block diagram illustrating the configuration of the camera of FIG. 1.

Referring to FIG. 2, if a camera activation command is generated, the control unit 100 controls to supply power to the camera 120. In a shooting or photographing mode, the control unit 100 drives the motor 240 such that the actuator 250 drives the optical unit 210. Here, the optical unit 210 picks up an image on a subject, and the image sensor 220 converts the pickup image to an electric signal. Here, the image sensor can be an image sensor supporting High Definition (HD) or higher resolution. The image picked up by the image sensor 220 is converted to a digital image by the Analog/Digital (AD) converter 230 and then transferred to the control unit 100. The flash 260 may be driven by the control unit 100.

As seen in FIG. 1, the image data output by the camera 120 is input to the control unit 100. The control unit 100 includes the aforementioned image processor and codec for processing the image data output by the camera 120. The image processor may further include a preprocessor, scaler, and postprocessor.

The preprocessor performs processing on the image output by the camera 120. Here, the preprocessing function may include 3A (Auto White Balance (AWB), Auto Exposure (AE), and Auto Focusing (AF)) extraction and processing, lens shading correction, dead pixel correction, etc. The scaler (image scaler) scales the image output by the preprocessor to a size which fits the display unit 130, and outputs the viewing image. The postprocessor performs post-processing on the full resolution image of the camera 120 which has been scaled by the scaler and preprocessed by the preprocessor. Here, the post-processing function includes color interpolation, noise removal, color compensation, and image conversion to generate YUV data. Although the present description is directed to the case where the scaler is positioned between the preprocessor and the postprocessor, the present invention is not limited thereto but can be implemented in such a way that the scaler is arranged before the preprocessor or after the postprocessor. The codec performs compressive encoding on the still image output by the postprocessor. The thumbnail image is generated when the codec encodes the still image, and a thumbnail image generator may be implemented independently to generate the thumbnail image.

Figure 3:
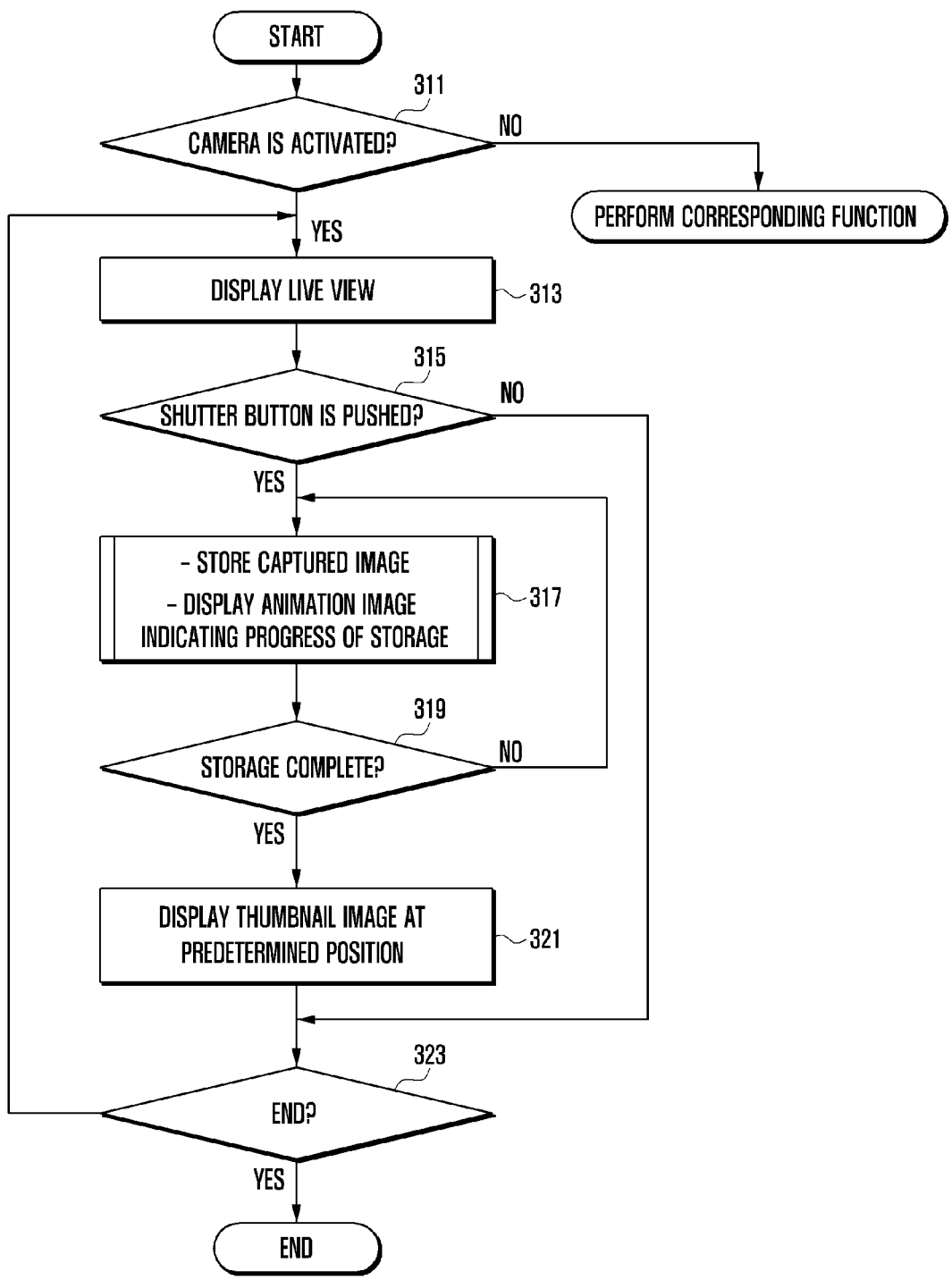
FIG. 3 is a flowchart illustrating an image storage method for storing a still image captured in the preview mode in the camera device according to an embodiment of the present invention.

FIG. 3 is a flowchart illustrating the image storage method for storing a still image captured in the preview mode in the camera device according to an embodiment of the present invention. FIGS. 4A to 4E are diagrams illustrating screens displayed in association with the procedure of capturing and storing still images in the memory in the image storage method of FIG. 3.

Referring to FIGS. 3 and 4A to 4E, if a camera activation command is input through the input unit 140, the control unit 100 detects this at step 311 and performs a review view operation in the preview mode for displaying a preview image input from the camera 120 at step 313. At this time, the camera 120 may be configured as shown in FIG. 2 and acquire images with the optical unit 210 by means of the actuator 250. In the preview mode, the control unit 100 processes the image input from the camera in units of frames and controls the display unit 130 to display the processed image in a live view form. At this time, preprocessing the image may include 3A (Auto White Balance (AWB), Auto Exposure (AE), and Auto Focusing (AF)) extraction and processing, lens shading correction, dead pixel correction, etc., as described above.

The preprocessed image may be scaled to fit the size of the display unit 130, and then post-processed through color interpolation, noise removal, color compensation, and image conversion to generate YUV data. The post-processed image is displayed on the screen of the display unit 130. In the preview mode, the control unit 100 processes the image from the camera 120 and controls the display unit 130 to display the processed image.

In the preview mode, if the user pushes the shutter button through the input unit 140, the control unit 100 detects this at step 315 and captures the image at the time when the shutter button is pushed, and stores the captured image as a still image in the memory 110 at step 317. At this time, the image processor of the control unit 100 generates the preview image and the still image simultaneously. At step 317, the control unit 100 further controls the display unit 130 to display the preview image along with an animation image indicating that the still images are being processed to be stored in the memory 110. At step 317, the display unit 130 presents the animation image indicating the progress of storing the captured image while displaying the preview image.

Typically, the captured still image is the full resolution image of the camera 120 and thus large in size as compared to the viewing image. When the shutter button is pushed, the control unit 100 processes the full resolution image output from the camera 120. In the still image processing procedure, the control unit 100 performs preprocessing and post-processing on the still image and compresses the processed still image, with the compressed image being stored in the memory 110. At this time, if the capture-requested image is the full resolution image, the control unit 100 skips scaling in the image processing procedure. Accordingly, there is a delay of a few frames from the time of pushing the shutter button and the time of storing the captured image. This delay is caused by the time necessary for acquiring the full resolution image at the time of pushing the shutter button, the time for processing the capture image at the image processor of the control unit 100, the time of compressing the processed image, and the time for storing the compressed still image in the memory 110. However, the user does not know the time to be taken for storing the captured image. The image storage method according to an embodiment of the present invention is capable of allowing the user to check the time needed to be taken for storing the captured image completely with the animation image which animates on the screen of the display unit 130 until the captured image is completely stored.

Here, the animation image may be a dummy image or a thumbnail image of the image that was shot or taken.

When the image cannot be processed to generate an animation image, the control unit 100 generates the animation image using a dummy image and uses the thumbnail image of the image that was shot or taken at the time when the animation ends (i.e. when the captured image is completely stored with the display of the thumbnail). At this time, the dummy image may be a simple dummy image or a dummy image acquired by processing the current preview image into the thumbnail image.

Second, the animation image may be generated with the thumbnail image of an image that was shot or taken. This means that the images shot by the camera are processed into thumbnail images for use in generating the animation image. In an embodiment of the present invention, the description is made under the assumption that the thumbnail images of the images taken are used for generating the animation image.

As described above, if the shutter button is switched on, the control unit 100 generates a still image and an animation image at step 317, and the animation image animates on the screen displaying the preview image until the still image is completely stored. In an embodiment of the present invention, it is assumed that the captured image is generated as a thumbnail image that is rolled cylindrically so as to rotate until the still image is loaded on the memory 110.

If the captured still image is completely stored in the memory 110, the control unit 100 detects this at step 319, displays the animation composed of the thumbnail images at a specific position on the live view screen at step 321, and the procedure returns to step 313. This operation is repeated until the user turn off the camera 120 and, if a camera deactivation request is generated, the control unit 100 detects this at step 323 and deactivates the camera 120.

Figure 4A:
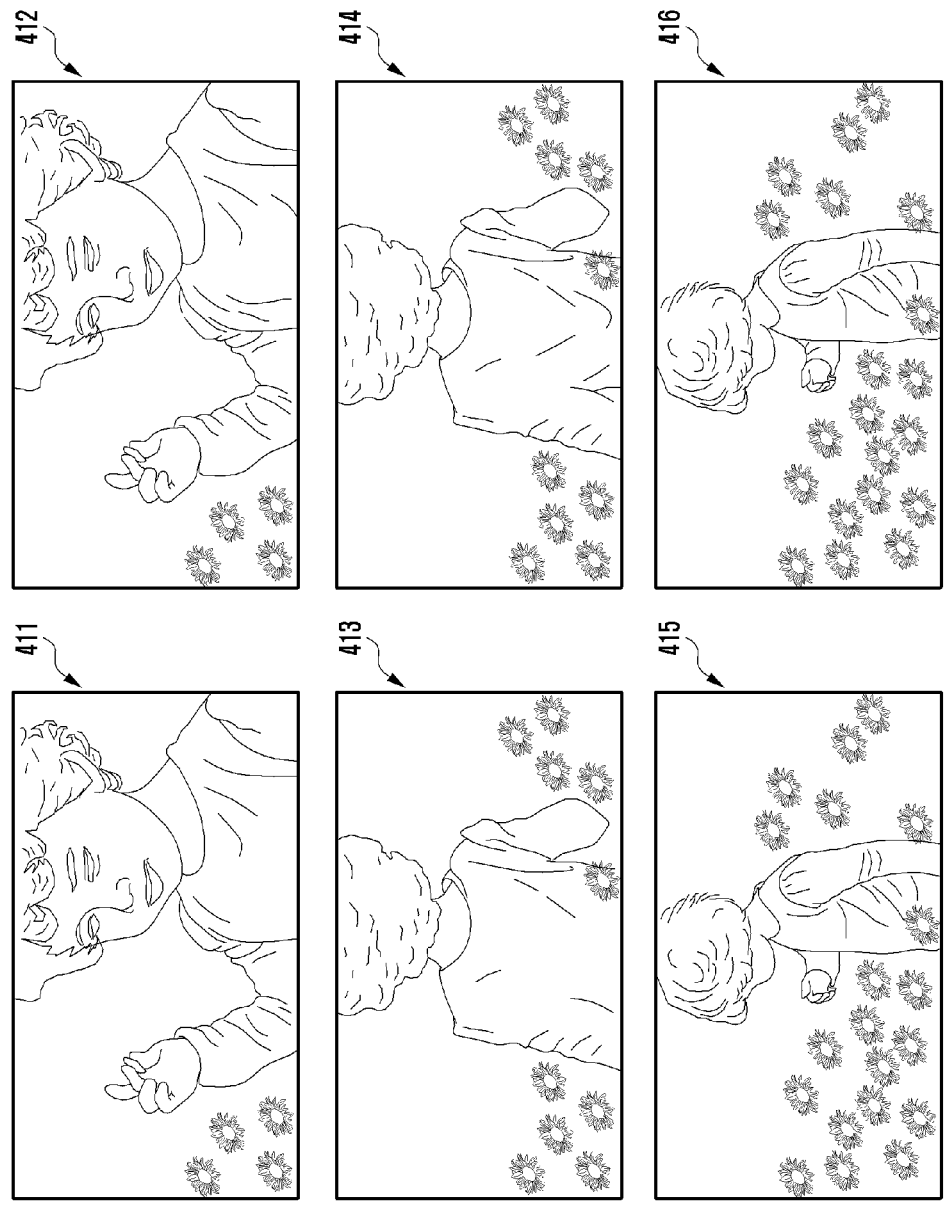
Figure 4B:
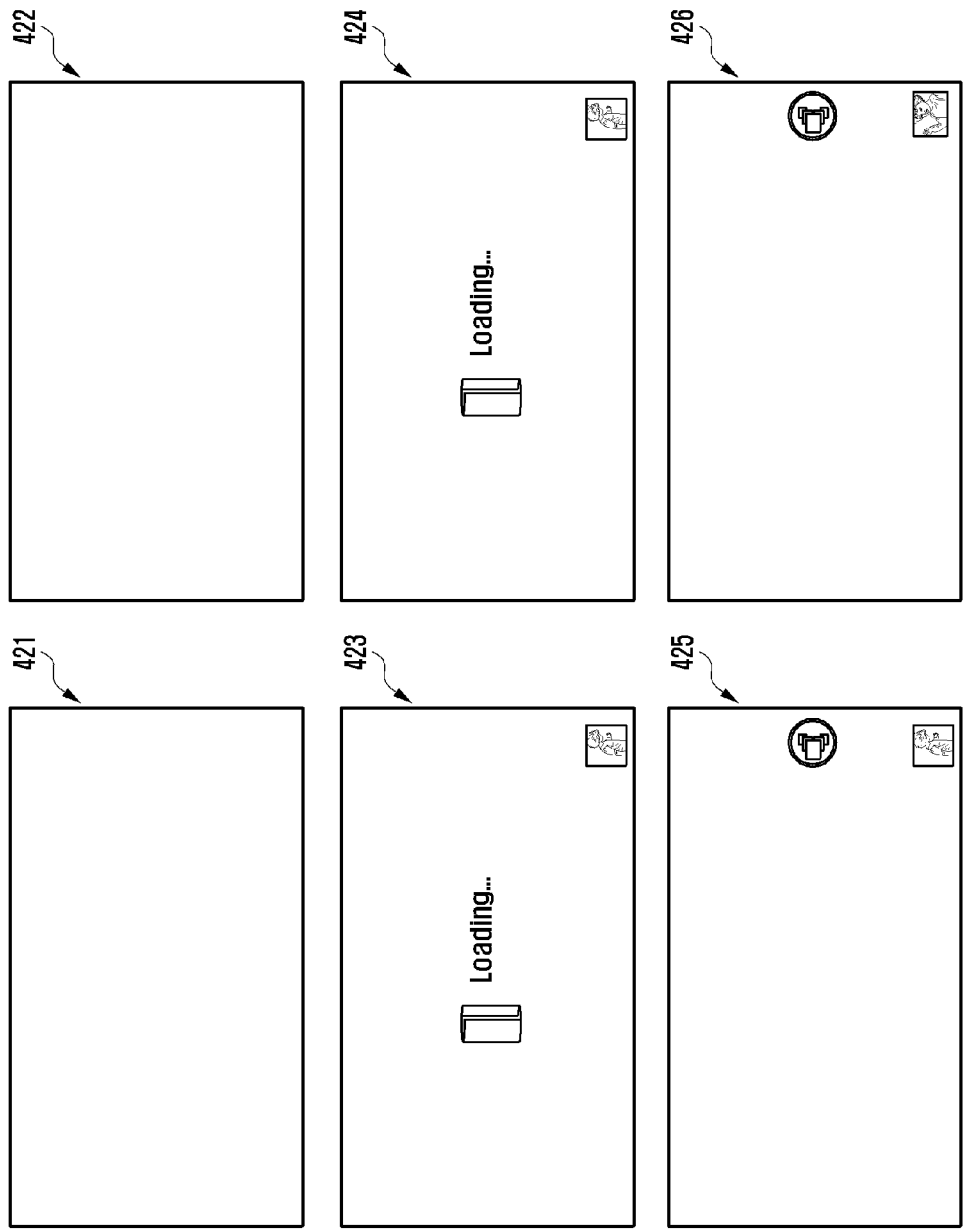
Figure 4C:
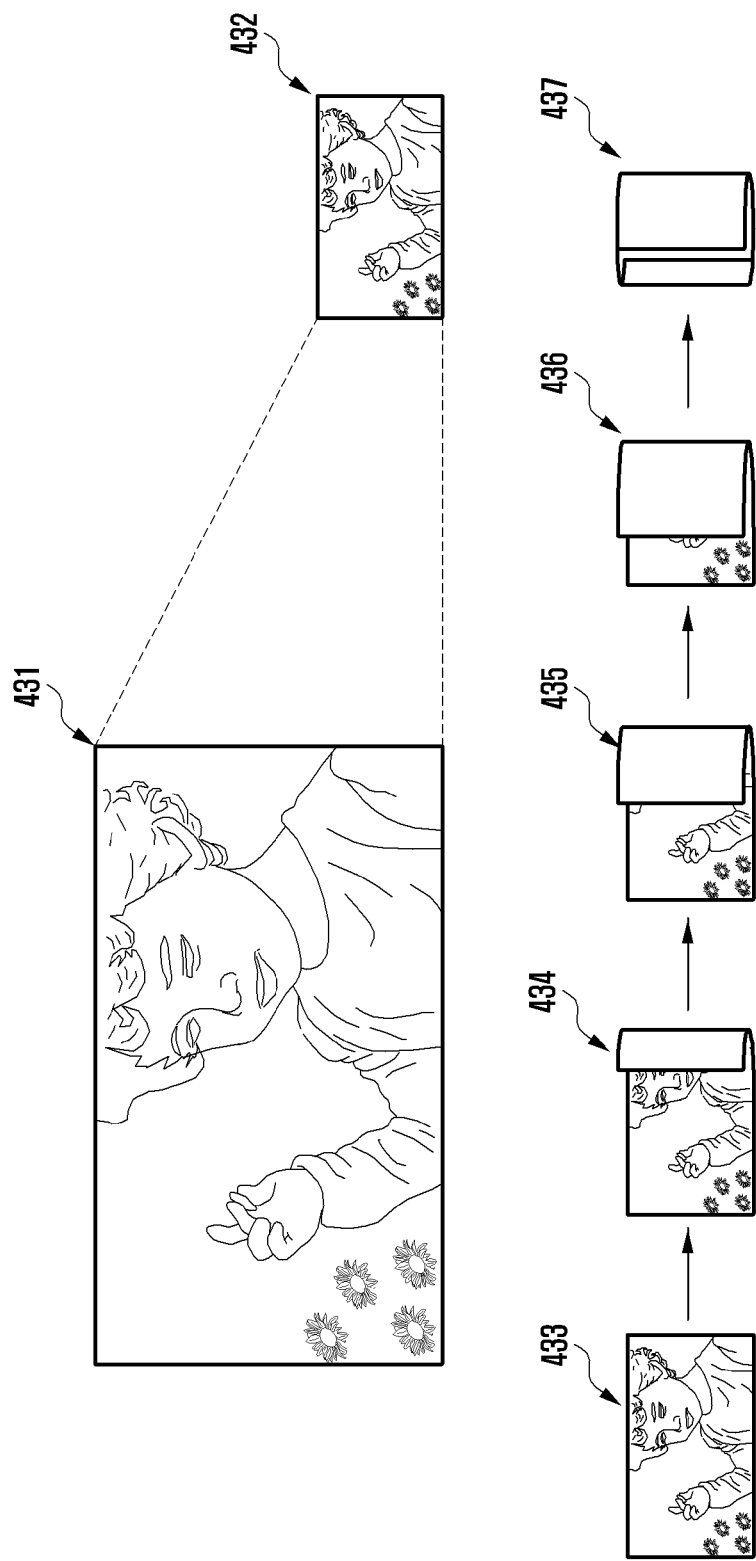
Figure 4D:
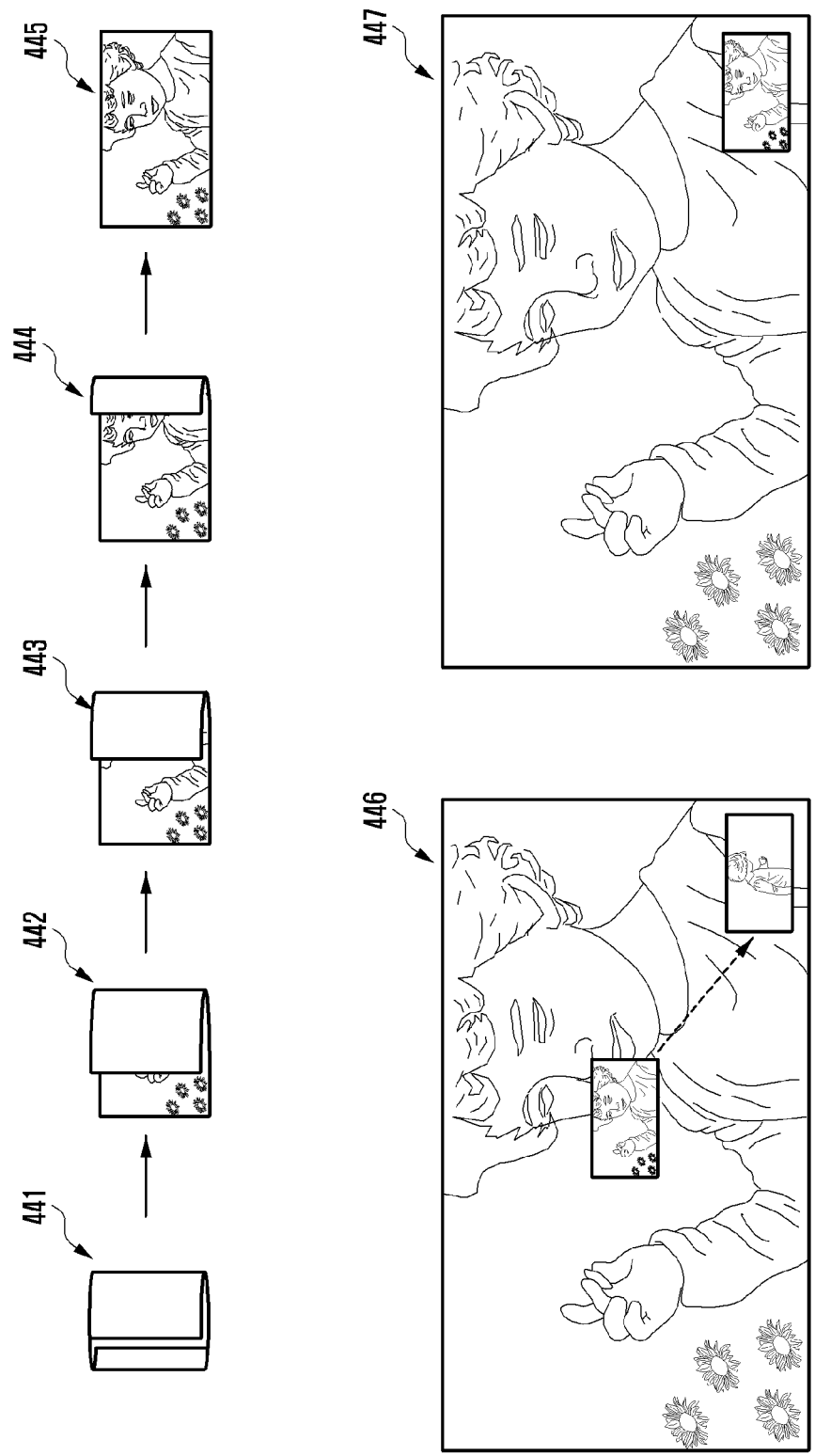

FIGS. 4A to 4E are diagrams explaining the operations of steps 317 to 321 of FIG. 3. Here, FIG. 4A shows the live view images displayed while processing and storing the captured still image, FIG. 4B shows animation images for notifying the user of the progress of storing the still image while processing and storing the captured still image, FIG. 4C shows a procedure of processing the captured image to generate a thumbnail image and converting the thumbnail image to an animation image (rolling the thumbnail into a cylinder herein) at the time when the capture request is detected, FIG. 4D shows a procedure of displaying the animation image as the thumbnail image at the time when the captured image is completely stored, and FIG. 4E shows the animation image on the screen of the display unit 130 along with the preview image, or a synthesized image of the preview image of FIG. 4A and the animation image of FIG. 4B.

In FIGS. 4A, 4B, and 4E, reference numerals 411, 421, and 451 denote the screen images in the preview mode; reference numbers 412, 422, and 452 denote the screen images at the time when a capture request is generated in the preview mode; reference numerals 413, 423, and 453 denote the images in the process of processing the captured image to generate a thumbnail image and rolling the thumbnail image cylindrically to generate an animation image; reference numerals 414, 424, and 454 denote the images in the process of expressing the animation; reference numerals 415, 425, and 455 denote the images in the process of unrolling the cylindrical animation image to the thumbnail image after completely storing the captured image and moving the thumbnail image to a predetermined position; and reference numerals 416, 426, and 456 denote the images displayed after the captured image has been completely stored such that the animation ends.

In the preview mode, the control unit 100 controls the display unit 130 to display the review view screen as denoted by reference numeral 411 of FIG. 4A in the state that any animation image is not generated yet. Accordingly, the screen image displayed by the display unit 130 is the image acquired from the camera 120 denoted by reference numeral 451 of FIG. 4E. If the shutter button is pushed in the preview mode, the control unit 100 detects this at step 315 and generates and displays the animation image. In this case, the animation image may be the still image as denoted by reference numeral 452 of FIG. 4E which is processed to generate a thumbnail image having a predetermined size. Even at this time, the display unit 130 displays the preview image screen as denoted by reference numeral 452 of FIG. 4E.

As mentioned above, the animation image may be generated with a dummy image. In this case, if the shutter is pushed, the control unit 100 detects this at step 315 and processes the dummy image to generate the animation image. At this time, the dummy image may be a previous preview image or a simple dummy image.

At this time, the method for generating the animation image with the captured image may be performed in the procedure of FIG. 4C. Referring to FIG. 4C, the captured image 431 is resized (or scaled) to generate the thumbnail image 432. Afterward, the thumbnail image 433 (resized as denoted by reference numeral 432) is rolled in a stepwise manner as denoted by reference numerals 434 to 437 so as to be placed at a predetermined position on the screen (at the center of the screen herein) as denoted by reference numeral 423 of FIG. 4B. Accordingly, if a capture request is generated, the control unit 100 outputs the review view image acquired from the camera 120 to the display unit 130 and generates the animation image as shown in FIG. 4C simultaneously, the animation image being placed at the center of the screen and rotating on the cylindrical axis. The image 423 of FIG. 4B is generated in the process of FIG. 4C and then moved to the center of the screen to rotate on the cylindrical axis. The animation image is displayed in the state of being synthesized with the image 413 of FIG. 4A so as to be displayed as shown in the screen image 453 of FIG. 4E.

In the case of generating the animation image with the dummy image, the control unit 100 resizes the dummy image to the thumbnail with animation effect and transforms the thumbnail image to a predetermined shape (cylinder shape herein) with animation effect. As mentioned above, the dummy image may be a previous preview image or a simple dummy image.

At this time, the control unit 100 animates the animation image while processing the still image captured at step 317 of FIG. 3, encoding and compressing the still image, and storing the compressed image. At this time, the live view image acquired from the camera 130 may be changed due to the movement of the subject and/or the movement of the camera 120. Accordingly, the user is capable of checking the state of processing and storing the captured image by means of the animation image after inputting the capture request.

Once the captured image is completely stored, the control unit 100 detects this at step 319 and executes the animation operation as shown in FIG. 4D. That is, if the image has been completely stored, the control unit 100 controls the cylindrical animation image as shown in the screen image 424 of FIG. 4B, which is unrolled to the original thumbnail image as denoted by reference numerals 441 to 445 with the animation effect on the screen of the display unit 130. The thumbnail image 445 unrolled from the cylindrical shape is moved from the center of the screen to a predetermined position as denoted by reference numeral 446. At this time, the images 423 to 425 of FIG. 4B and the thumbnail image of the previously captured image and, if the currently captured image is completely stored, the thumbnail image is moved as denoted by reference numeral 425 of FIG. 4B and, finally, replaced by the current captured image as denoted by reference numeral 426 of FIG. 4B.

When the animation image is generated with a dummy image, the control unit 100 displays the thumbnail image of the image taken when the animation ends (i.e. the time when the thumbnail image is displayed after completely storing the captured image).

If a capture request is generated in the preview mode, the control unit 100 acquires the live view images from the camera 120, processes the captured image to generate a thumbnail image as shown in FIGS. 4B to 4D, and expresses the thumbnail image as an animation until the capture image is completely stored as shown in FIG. 4A, and the display unit 130 displays the images synthesized as shown in FIGS. 4A to 4D.

Figure 5:
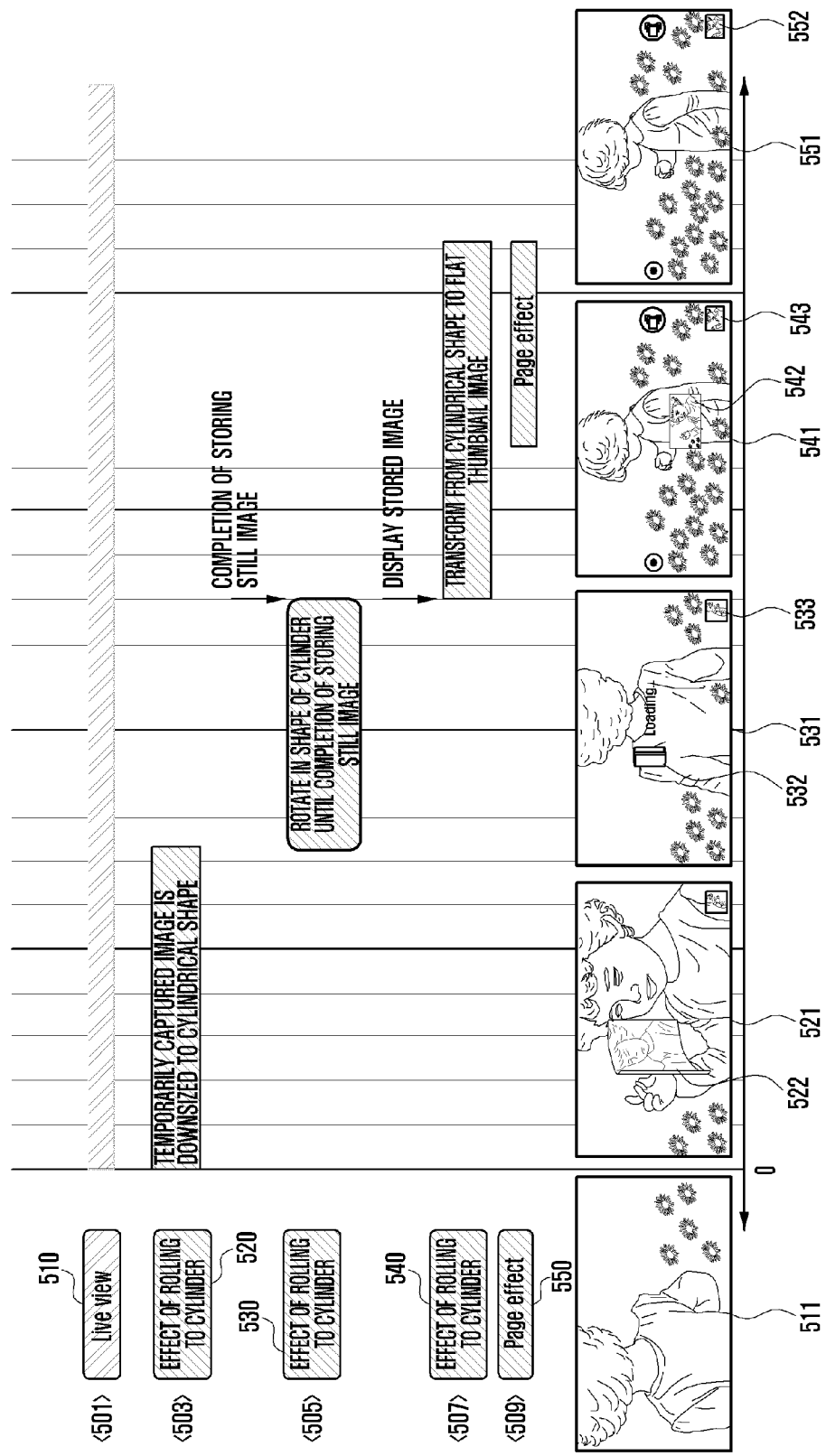
FIG. 5 is a diagram illustrating the procedure of storing the image capture in the camera device according to an embodiment of the present invention.

FIG. 5 is a diagram illustrating the procedure of storing the image captured in the camera device according to an embodiment of the present invention. FIG. 5 shows the operation steps and corresponding screens of the procedure of FIG. 3.

Referring to FIG. 5, the camera device is operating in the preview mode at step 501. In this case, the control unit 100 controls the display unit 130 to display the image 511 acquired from the camera 120. In the preview mode, if the user inputs a capture request by means of the input unit 140, the control unit 100 detects this and processes the captured image 521 to generate a thumbnail at step 503 and then an animation image with the effect of rolling into a cylindrical shape. At this time, the control unit 100 controls the display unit 130 to display the thumbnail image of the image captured in the previous state as denoted by reference numeral 523.

Afterward, the control unit 100 rotates the thumbnail image 532 which has been rolled in the shape of a cylinder to indicate the start of storing the captured image until the captured image is completely processed (preprocessing, post-processing, compressive encoding, saving, etc.). That is, until the still image is completely stored, the control unit 100 rotates the thumbnail image in the shape of a cylinder at step 317. At this time, the thumbnail image 533 of the previously captured image is displayed on the screen.

If the still image is completely stored, the control unit 100 detects this at step 319 unrolls the cylindrical thumbnail to the thumbnail image 542 through the procedure of FIG. 4D at step 507 and moves the thumbnail image 542 to the previous position of thumbnail image 543. That is, the control unit 100 unrolls the thumbnail image of the capture image stored at step 507 from the cylindrical shape to the flat thumbnail image. Afterward, the control unit 100 moves the thumbnail image 542 to a predetermined position 552 with a page effect at step 509.

As shown in FIG. 5, if a capture request is input in the preview mode, the live view image acquired from the camera 120 changes according to the movement of the camera and/or the subject as denoted by reference numerals 511 to 551, and the still image acquired at the capture request time is converted to the thumbnail image, which animates until the capture image is stored completely as denoted by reference numerals 522 to 552.

The image storage method and apparatus of the present invention is capable of capturing a still image while displaying a live view and animating an animation image until the captured image is completely stored, whereby the user can check the progress and time of storing the captured image in the camera device and camera-equipped mobile terminal. Since the time to be taken for capturing and storing the image in the preview mode is indicated, it is possible for the user to avoid pushing the shutter button unnecessarily before the current image is completely stored.

While the invention has been shown and described with reference to certain embodiments thereof, it will be understood by those skilled in the art that various changes in form and detail may be made therein without departing from the spirit and scope of the invention as defined by the appended claims.

What is claimed is:

1. An image storage method of a camera device, the method comprising:
    displaying a live view image in a preview mode;
    detecting a capture request;
    initiating a progress to store a capture image acquired from a camera in response to the capture request;
    in response to the capture request, generating an animation image from the live view image, the animation image indicates the progress of storing the captured image in response to the capture request, and a resolution of the animation image is less than a resolution of the captured image;
    displaying the animation image with the live view image during the progress of the storing the captured image, the animation image is displayed on a predetermined part of the live view image; and
    displaying, when the progress of the storing of the captured image is completely finished, a thumbnail image of the animation image on the predetermined part of the live view image instead of the animation image.

2. The method of claim 1, wherein generating the animation image comprises:
    converting one frame of the live view image to the thumbnail image, the thumbnail image being displayed;
    transforming the thumbnail image to a predetermined shape, the transformed thumbnail image being displayed; and
    animating the transformed thumbnail image as the animation image, the animation image being displayed along with the live view image.

3. The method of claim 2, further comprising moving the transformed thumbnail image to a predetermined position on a screen.

4. The method of claim 3, wherein the predetermined position is around a center of the screen.

5. The method of claim 3, wherein animating the transformed thumbnail image comprises rotating the transformed thumbnail image to indicate the progress of storing the captured image.

6. The method of claim 4, wherein the transformed thumbnail image is generated by rolling the thumbnail image to rotate in a shape of cylinder.

7. The method of claim 5, wherein displaying the thumbnail image comprises unrolling the transformed thumbnail image rotating in the shape of a cylinder, the unrolled thumbnail image being displayed at a position different from the predetermined position on the screen.

8. A camera device comprising:
    a camera for acquiring an image;
    an input unit for detecting a capture request;
    a display unit configured to display the acquired image;
    a memory configured to store the image; and
    a control unit configured to:

control the display unit to display a live view image in a preview mode, initiate a progress to store a captured image acquired from the camera in response to the capture request, in response to the capture request, generate an animation image from the live view image, the animation image indicates the progress of storing the captured image in response to the capture request, and resolution of the animation image is less than a resolution of the captured image, control the display unit to display the animation image during the progress of the storing the captured image, the animation image is displayed on a predetermined part of the live view image, and control the display unit to display, when the progress of the storing the captured image is completely finished, a thumbnail image of the animation image on the predetermined part of the live view image instead of the animation image.

9. The camera device of claim 8, wherein the control unit is further configured to:

convert one frame of the live view image to the thumbnail image, transform the thumbnail image to a predetermined shape, and animate the transformed thumbnail image as the animation image, the animation image being displayed along with the live view image.

10. The camera device of claim 9, wherein the control unit is further configured to move the transformed thumbnail image to a predetermined position on a screen.

11. The camera device of claim 10, wherein the predetermined position is around a center of the screen.

12. The camera device of claim 9, wherein the control unit is further configured to rotate the transformed thumbnail image to indicate the progress of storing the captured image.

13. The camera device of claim 12, wherein the transformed thumbnail image is generated by rolling the thumbnail image to rotate in a shape of a cylinder.

14. The camera device of claim 12, wherein the control unit is further configured to unroll the transformed thumbnail image rotating in the shape of cylinder, the unrolled thumbnail image being displayed at a position different from the predetermined position on the screen.

* * * * *